United States Patent [19]

Heath

[11] Patent Number: 5,670,858
[45] Date of Patent: Sep. 23, 1997

[54] SINGLE-PHASE INDUCTION MOTOR SAFETY CONTROLLER

[75] Inventor: Gary Heath, Longwood, Fla.

[73] Assignee: Condyne Technology, Inc., Longwood, Fla.

[21] Appl. No.: 726,625

[22] Filed: Oct. 7, 1996

Related U.S. Application Data

[63] Continuation of Ser. No. 116,813, Sep. 7, 1993, abandoned, which is a continuation of Ser. No. 710,380, Jun. 3, 1991, abandoned.

[51] Int. Cl.$^6$ ........................................ H02P 1/26
[52] U.S. Cl. .................. 318/768; 318/786; 318/805; 318/810; 307/362; 363/21
[58] Field of Search .................. 318/777, 768, 318/781, 786, 801, 803, 805, 806, 807, 808, 809, 810, 811, 599, 254; 307/234, 350, 362, 87, 311; 363/17, 18, 19, 21, 26, 23, 37, 89, 79, 56, 124, 126, 286, 53, 68; 323/345, 282, 323; 361/75, 96

[56] References Cited

U.S. PATENT DOCUMENTS

| | | | |
|---|---|---|---|
| 3,882,364 | 5/1975 | Wright et al. | 318/786 |
| 3,913,002 | 10/1975 | Steigerwald et al. | 363/18 |
| 4,004,215 | 1/1977 | Jauniszko | 363/23 |
| 4,052,648 | 10/1977 | Nola . | |
| 4,266,177 | 5/1981 | Nola . | |
| 4,330,816 | 5/1982 | Imazeto et al. | 363/56 |
| 4,355,274 | 10/1982 | Bourbeau | 318/812 |
| 4,382,217 | 5/1983 | Horner et al. | 318/786 |
| 4,404,511 | 9/1983 | Nola . | |
| 4,412,158 | 10/1983 | Jefferson et al. | 318/257 |
| 4,417,190 | 11/1983 | Nola . | |
| 4,417,193 | 11/1983 | Hirata | 318/803 |
| 4,426,614 | 1/1984 | Nola . | |
| 4,433,276 | 2/1984 | Nola . | |
| 4,439,718 | 3/1984 | Nola . | |
| 4,459,528 | 7/1984 | Nola . | |
| 4,469,998 | 9/1984 | Nola . | |
| 4,471,421 | 9/1984 | Brown et al. | 363/68 |
| 4,482,852 | 11/1984 | Muskovac | 318/812 |
| 4,494,180 | 1/1985 | Streater et al. | 318/801 |
| 4,539,562 | 9/1985 | Sanders | 307/350 |
| 4,604,563 | 8/1986 | Min | 318/786 |
| 4,825,351 | 4/1989 | Uesugi | 363/89 |
| 4,910,447 | 3/1990 | Masters | 318/599 |
| 4,935,691 | 6/1990 | Lamar | 323/323 |

*Primary Examiner*—John W. Cabeca
*Attorney, Agent, or Firm*—Edward M. Livingston, Esq.

[57] ABSTRACT

An electronic control apparatus to operate an alternating current induction motor protecting same from power line blackouts, brownouts and providing self-adjusting, linearized, non-stepped reduced voltage output coinciding to work load to enhance efficiency, thereby reducing electrical energy used by the motor. This apparatus can be utilized in conjunction with a refrigerator, air conditioner or almost any home appliance to yield a substantial savings in electrical use.

20 Claims, 4 Drawing Sheets

SINGLE-PHASE INDUCTION MOTOR SAFETY CONTROLLER

CROSS-REFERENCE TO RELATED APPLICATION

This is a continuation of application Ser. No. 08/116,813, filed Sep. 07, 1993—now abandoned; which is a continuation of application Ser. No. 07/710,380, filed Jun. 03, 1991—now abandoned.

BACKGROUND OF THE INVENTION

This invention relates to motor control system and more particularly to single-phase alternating current induction motors.

Although pulse-width modulated motor control systems are well known for control of single-phase motors and their fluctuating loads, such systems require field adjustments to satisfy varying applications. Moreover, the erratic operation from stepped function gate control used by prior motor controllers, along with loading excursions beyond field adjustability, degrades system performance and can damage motor and adjacent mechanical apparatuses. Important considerations for any motor control should also involve means of sensing and reacting to existing power line conditions and load side characteristics to protect the motor from catastrophic failure and extend the life of same. Also, a motor controller should protect air-conditioning and refrigeration motors when a short power outage brings a compressor on under high lead pressure, which could cause damage and reduce motor life.

The prior patented art includes the following patents related to motor control apparatuses.

| U.S. Pat. No. | Inventor | Issue Date |
| --- | --- | --- |
| 4,052,649 | Nola | 10/04/77 |
| 3,307,084 | Ogle | 02/28/67 |
| 4,788,485 | Kawagishi | 11/29/88 |
| 3,124,734 | Sampietro | 03/10/64 |
| 3,105,180 | Burnett | 09/24/63 |
| 3,775,652 | Bowler | 11/27/73 |
| 4,186,334 | Hirata | 01/29/80 |
| 3,758,836 | Shibata | 09/11/73 |
| 3,763,417 | Johnston | 10/02/73 |

Although the Nola patent provides a motor control, the Nola device must be set manually in the field for each motor application, as does the other prior art, because the devices do not automatically adjust to the AC motor as does the present invention. Field adjustment requires that an amp meter be used to set the prior devices each time when it is in the field.

In addition, the Nola patent operates differently in that it utilizes a step-function approach to the control of the motor, whereas the present invention operates linearly in real time. Moreover, none of the above patents provide protection to the motor in a brownout situation, which could cause a motor to churn and thereby malfunction. On the other hand, the present invention shuts off the motor in voltage situations which are less than that required by the motor. Furthermore, the present invention provides for a delayed start-up of the motor once power is returned.

Thus, none of the prior patented inventions provides the full range of controlling a motor in an automatically-adjustable manner as does the present invention.

SUMMARY OF THE INVENTION

The primary object of the present invention is to provide an electronic means to automatically adjust input power to a single-phase induction motor.

A corollary object of the present invention is to provide the most efficient means of adjusting electrical power input in conjunction with varying input voltages and loading.

Another object is to provide an on-delay for full power in blackout conditions or initial start-ups.

A further object is to provide a means of shutting off power to a motor in low voltage brownout conditions.

An even further object is to provide an over-current detection means which overrides reduced voltage runs to supply a full voltage source for a motor.

An additional object of the present invention is to provide an auxiliary circuit means to act as an off delay to stop power to the motor to relieve high head pressure start-ups in refrigeration or air conditioning applications.

The present invention accomplishes the above and other objects by providing an electronic controller apparatus for alternating current induction motors which provides means for sampling voltage and current inputs from an electrical source to the motor, said means being connected to the input line, the sampled voltage is rectified and compared to reference voltage provided by a regulator. At the same time, the sample current is also compared to pre-set reference currents to determine if the current is proper to operate the motor. If the voltage and current are within acceptable limits, then they are provided to the motor. After the motor is operating, the load requirements of the motor are continuously monitored and the voltage and current are continuously adjusted in accordance with the load requirements of thee motor, whereby the motor uses a lower average voltage and current, thereby consuming less electrical power. The present invention further provides optional means for delay and re-commencement of electrical power from the electrical power source after a voltage interruption caused by the power source dropping below a pre-set voltage. The latter is accomplished by means of an auxiliary time-delay circuit built into the present invention.

The above objects and advantages of the present invention will become more readily apparent when a preferred embodiment is discussed in detail in conjunction with the drawings.

BRIEF DESCRIPTION OF THE DRAWINGS

The drawings used in conjunction with the detailed description of the preferred embodiments in order to provide a complete understanding of the present invention and its advantages are as follows:

FIG. 3a shows the AC sine wave voltage supplied to the invention;

FIG. 3b shows the full wave rectified signal present at point 3b of FIG. 2;

FIG. 3c shows the zero-crossing voltage detector output present at point 3c of FIG. 2;

FIG. 3d shows the current of the motor being controlled by the invention;

FIG. 3e shows the zero-crossing detector input and output current into the monstable circuit at point 3e of FIG. 2 and out of the monstable at point 3f of FIG. 2;

FIG. 3g shows the signal when the triac 12 of FIG. 2 is on, which is also the input to the opto-coupler 23 of FIG. 2 and at point 3g of FIG. 2;

FIG. 3h shows the time periods when the triac gate is conducting;

FIG. 3i shows the auxiliary time delay 50 in FIG. 2 which, with its signal preset 3h of FIG. 2 to inhibit the nor gate 24 of FIG. 2;

FIG. 3j shows the action of the current surge detection circuit with a superimposed high current wave form which engages the one-shot 26 of FIG. 2;

DESCRIPTION OF THE PREFERRED EMBODIMENTS

Figure 1:
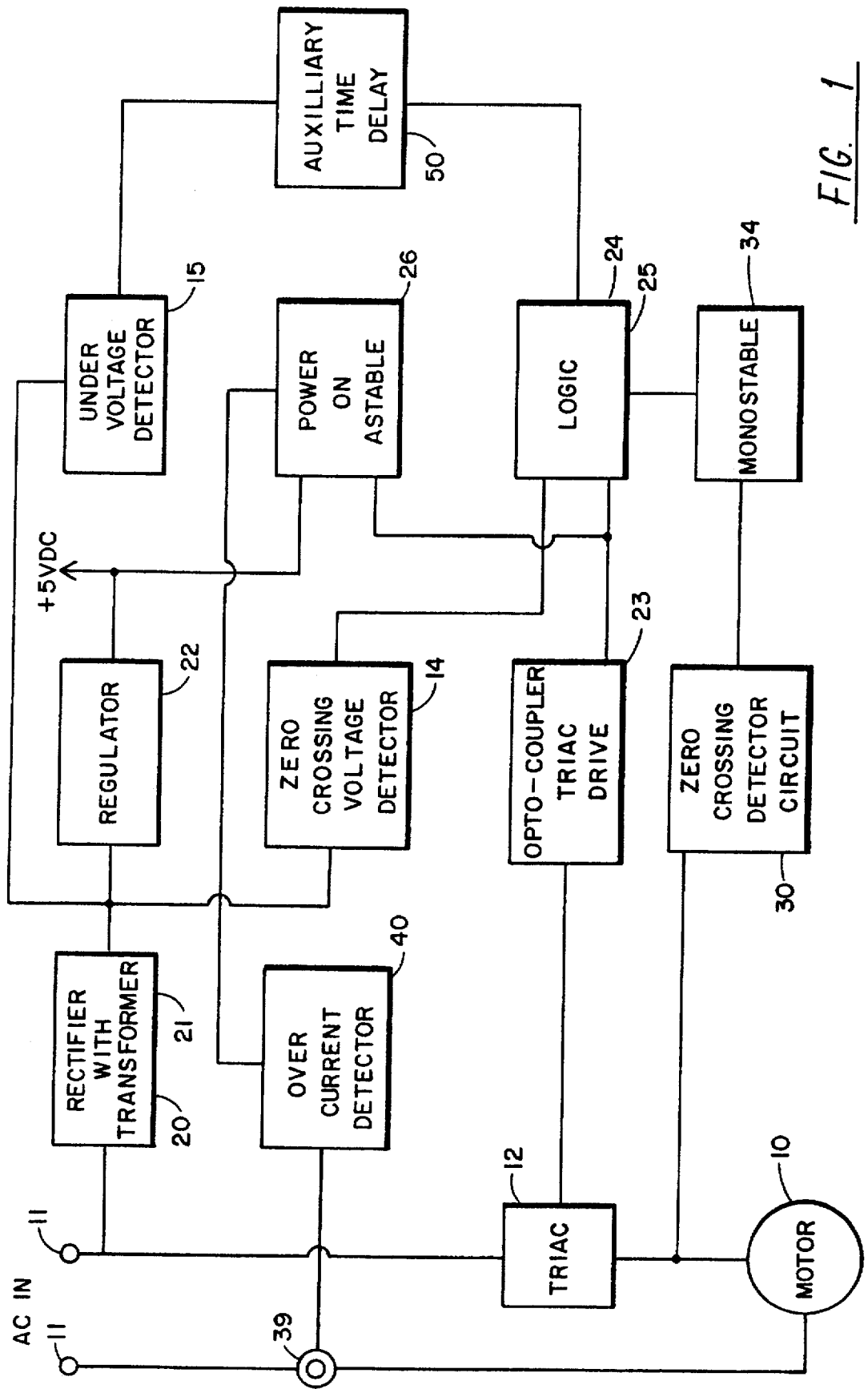
FIG. 1 is a block diagram of the system of the invention.
Figure 2:
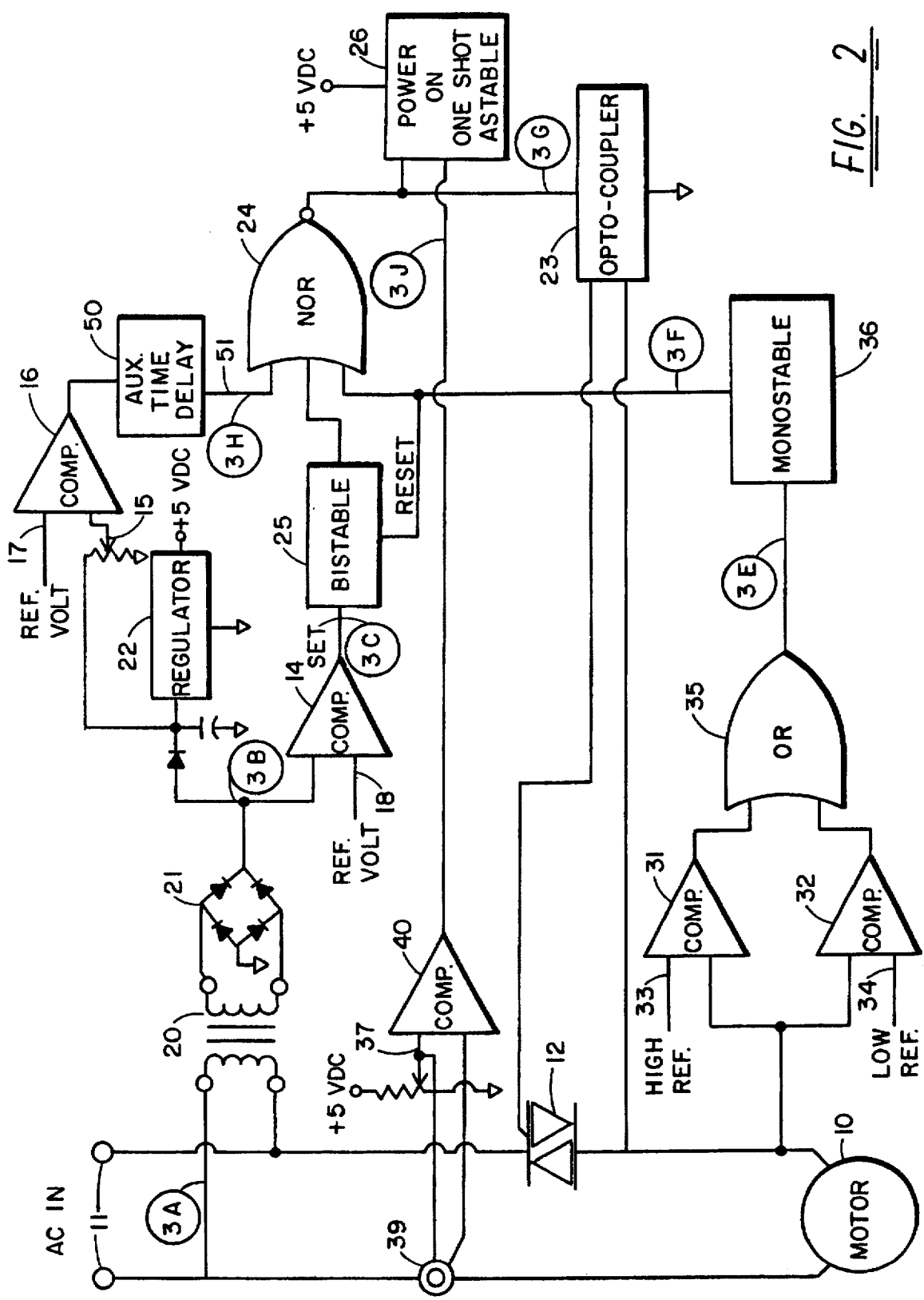
FIG. 2 is an electronic schematic diagram of the invention.

Referring to FIGS. 1 and 2 of the drawings, an AC induction motor 10 is powered by input voltage 11 through a triac 12. Alternatively, the motor 10 can also be powered through back-to-back Scrs rather than the triac 12. A step-down type transformer 20 reduces the line voltage to approximately 8 VRMS. A full wave bridge rectifier 21 then provides a rectified full wave signal of approximately 11 volts peak to the input of a 5-volt direct current (DC) regulator 22 and to one input of a voltage input comparator 14 and also to two variable inputs, input 15 of the over-voltage comparator 16, and input 37 of the over-current comparator 40. The over-current comparator input 37 is connected via a variable resistor to a ring-type current sensor 39. The sensor is also connected to the power on one shot astable 26 and serves as a part of the logic control for the device. The DC regulator 22 also provides regulated +5 VDC for the rest of the electronic components. The +5 VDC is also divided down to provide reference voltages 17, 18, 33, and 34 for comparators 16, 14, 31 and 32, respectively.

The under-voltage comparator 16 and auxiliary time delay circuit 50 will cause the input to the opto-coupler 23 to remain off whenever the input line voltage 11 drops below the level preset by resistor 15 or when the output of comparator 16 is adapted to the auxiliary time delay circuit 50 through output 51. The latter is accomplished by providing a logic high to the NOR 24 to prevent its output from going high.

Then the rectified output of the full-wave bridge rectifier 21 is compared to a reference voltage 18 at the input of comparator 14. The output of comparator 14 is a pulse every half cycle of the input voltage. This pulse occurs centered around the zero crossing of the input voltage 11. These pulses are used to set a Bistable 25 and prevent an output from the NOR 24 circuit.

The power on one-shot astable 26 and over-current comparator 40 with its preset resistor 37 gives a logic high to the input of opto-coupler 23 for a period of approximately 45 seconds. This holds the triac 12 fully on for this period to provide full electrical power and allows the motor 10 to come up to speed with full power applied. The motor 10 could be the AC motor in a refrigerator, air-conditioning or other appliance.

A sample of the voltage across the triac 12 which represents the current through it and the motor 10 is fed through the dual comparators 31 and 32 to monitor both polarities of the current. These comparators function to determine the zero-crossing points of the current. When the current wave form crosses through zero, a pulse is output from the OR 35 circuit. This occurs 8.33 milliseconds for a 60 Hz. input voltage.

Then these pulses are used to trigger a monstable or one-shot circuit 36. The duration of the one-shot signal output is present at the manufacturing of the system, but is nominally set to be 1–3 milliseconds wide. This output pulse (a logic high) resets the Bistable 25 and provides a logic high to NOR 24. This output high, even though the other two inputs are now at logic low, outputs a logic low to the opto-coupler 23. This means the triac 12 is not turned on for this duration (nominally 2 milliseconds). The result is a 2 millisecond delay from the time the motor current drops to zero (and the triac turned off) and the triac 12 turns on and applies voltage to the motor 10. This, in turn, means a lowered average voltage and current and less power consumed by the motor.

Figure 3:
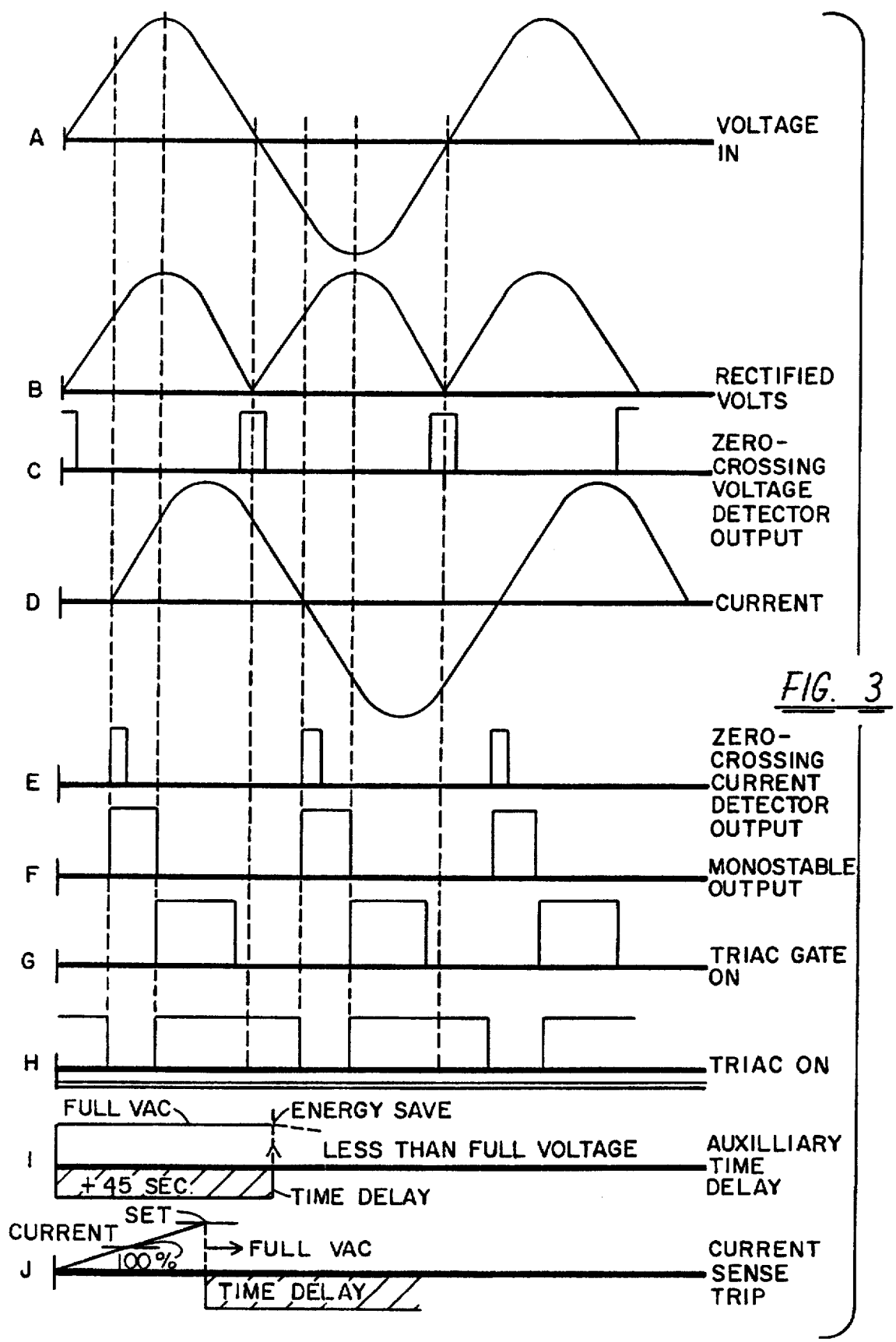
FIG. 3 illustrates the various signals produced in the invention shown in FIGS. 1 and 2 as follows.

As illustrated in FIG. 3, a–h, when the load of the motor increases, the zero-crossing of the current approaches the zero-crossing of the voltage and the delay has less and less effect as the 2-millisecond delay now represents less and less voltage being missed before turn on of the triac 12.

Figure 4:
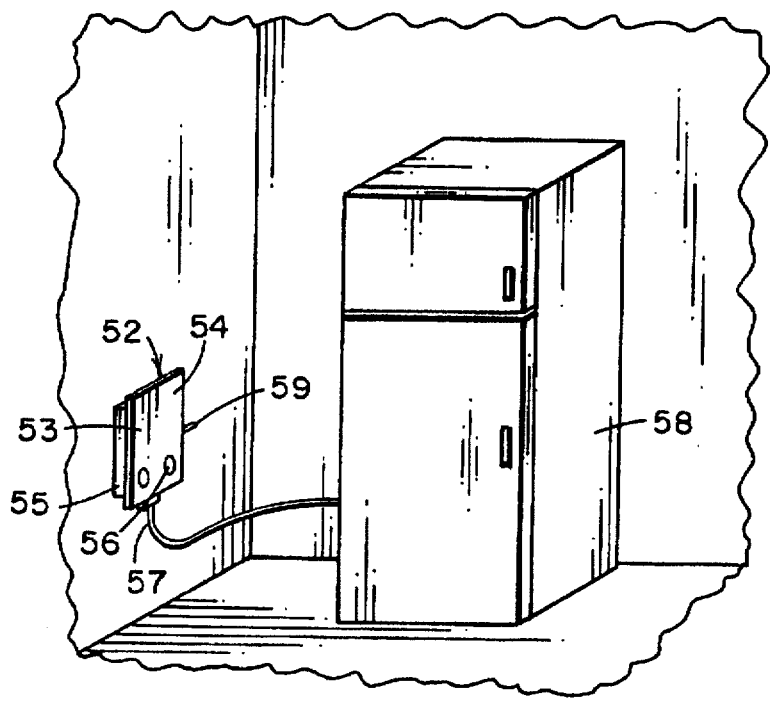
FIG. 4 shows the apparatus in use with a refrigerator or other appliance.

In actual application and operation, the circuitry described hereinabove is incorporated into a compact, motor-control plug-in device 52 as illustrated in FIG. 4. The device 52 can be plugged into a regular household wall socket next to the appliance on which the device is being used. For instance, in FIG. 4, the device 52 is shown being utilized for a refrigerator 58. The electric cord 57 from the refrigerator 58 is plugged into the bottom or side of the device 52. In this particular application, of the device 52 will also contain a heat sink 53 on the back thereof for cooling purposes. In the hand-wired version, a heat sink may be contained on the side of the device. On its face 54, the device 52 may contain an indicator light 55 which would be illuminated when the unit is engaged or to show a fault. An additional light 56 may also be included on the face to indicate when the unit is actually saving energy. An on/off or override switch 41 may also be optionally provided to shut off the unit when its use is not desired, particularly in the hand-wired version of FIG. 5.

Figure 5:
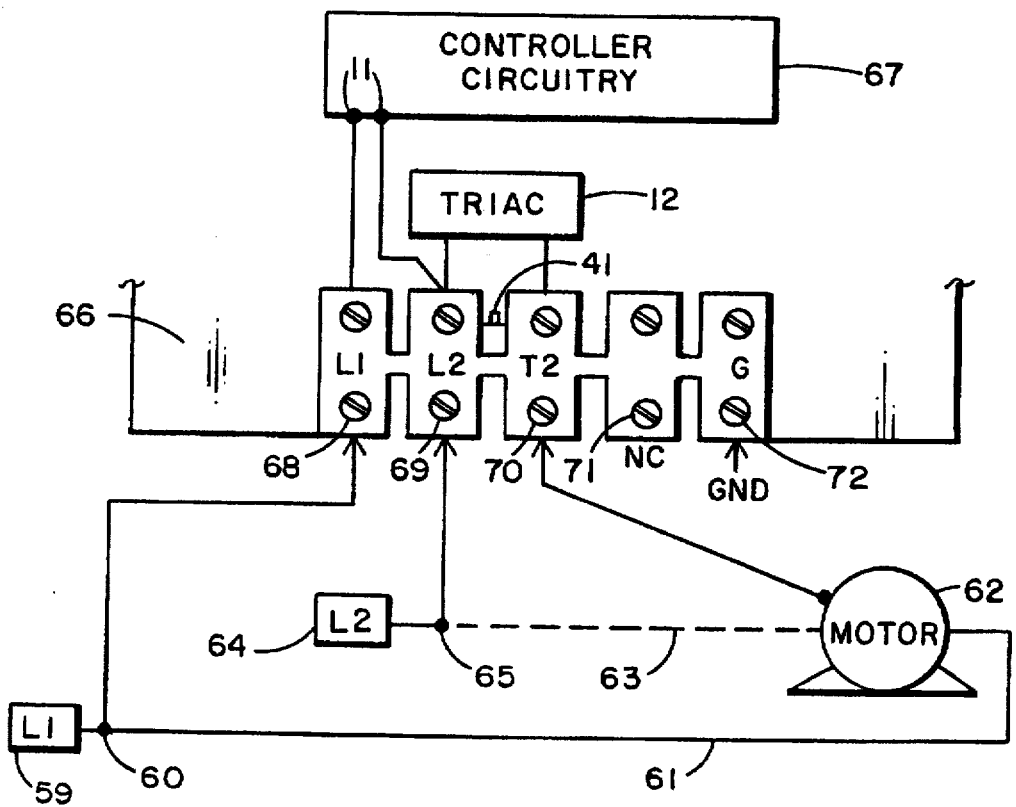
FIG. 5 shows a hand-wired version of the apparatus as it would be connected to an induction motor for various applications, such as air conditioning, compressors, pumps and industrial applications.

Although the device 52 is illustrated as a stand-alone unit when utilized with refrigerator 58 in FIG. 4, in some motor applications, such as in an air-conditioner, the circuitry of the device 52 incorporating the circuitry would be hard-wired into the appliance before or after market rather than being plugged into an electric socket as shown in FIG. 4. FIG. 5 shows a hard-wire version of the invention. A barrier strip 66 interconnects the controller circuitry 67 and the motor 62 via the AC input voltage lines 11. The motor 62 is connected to the original AC input from external power supply 59 via an electrical line 61 and tie in 61. The hot input line 59 is also tied into the barrier strip 66 at 68. The original neutral line 63 is disconnected from the motor and the neutral electrical line 64 is tied in at 65 to the neutral input line to barrier strip 69. The motor 62 connects directly to the barrier strip at 70 from which the motor receives its input from the controller circuitry 67. An optional override switch 41 is provided for shutting off the circuit. The barrier strip 66 is connected to the triac 12 which is in turn connected to the controller circuitry 67.

It should be apparent from the above-detailed description of the preferred embodiment of this invention that there has been provided a novel and non-obvious AC induction motor control device which offers numerous advantages and benefits. Among the advantages and benefits provided by the present invention, is that it continually adjusts to the minimum current necessary to run a particular motor with no loss of motor function, thereby providing maximum savings in electricity. Tests have shown the savings range anywhere from ten to forty percent, depending on the particular appliance to which the invention is applied. Also, as the motor is provided only the minimum voltage it needs, the motor will run cooler thereby extending the life of the motor. A further advantage is that the device protects motors from brownout situations which eliminates motor damage due to low input voltage. Air conditioning units, refrigerators and other devices utilizing the invention thus run more efficiently. A further advantage is that this device provides surge and lightning protection which extends the life of the appliance. An even further advantageous feature is that this motor controller provides overcurrent protection to an AC induction motor. A further optional feature is that the device incorporates a start-up delay to insure maximum starting torque and minimizes surges after a voltage interruption. This "soft-start" feature enhances the life of the appliance.

Although the above-detailed description has dealt with only one preferred embodiment of the device, this invention incorporates any and all modifications within the scope or equivalent of the claims.

Having thus described my invention, I claim the following:

1. An electronic control apparatus for automatically adjusting electrical input to a single phase alternating current (AC) induction motor running at constant RPM comprising:
   means for sampling voltage input provided by an electrical source to the motor, said means being connected to an input line from the electrical source;
   means for rectifying the sample voltage input taken from the electrical source to yield a rectified output voltage;
   means for creating a fixed pulse indicating zero voltage crossing;
   means for sampling current input being provided by the electrical source to the motor to create a time-variable pulse indicating zero current crossing, said time-variable pulse which triggers a monostable output voltage; and
   means for adjusting voltage supplied to the motor by using the fixed pulse and the monostable output voltage.

2. The electronic control apparatus of claim 1 further comprising:
   means for comparing the rectified voltage to a preset universal reference voltage provided by a regulator to detect voltage burnout conditions.

3. The electronic control apparatus of claim 1 further comprising:
   means for comparing sampled current input to a preset reference current from the electrical power source to detect overcurrent conditions.

4. The electronic control apparatus of claim 2 further comprising:
   means for comparing sampled current input to a preset reference current from the electrical power source to detect overcurrent conditions.

5. The electronic control apparatus of claim 1, further comprising:
   means for delaying re-commencement of electrical power from the electrical power source after a voltage interruption caused when the voltage from the power source drops below a pre-set voltage.

6. The electronic control apparatus of claim 2, further comprising:
   means for delaying re-commencement of electrical power from the electrical power source after a voltage interruption caused when the voltage from the power source drops below a pre-set voltage.

7. The electronic control apparatus of claim 3, further comprising:
   means for delaying re-commencement of electrical power from the electrical power source after a voltage interruption caused when the voltage from the power source drops below a pre-set voltage.

8. The electronic control apparatus of claim 4, further comprising:
   means for delaying re-commencement of electrical power from the electrical power source after a voltage interruption caused when the voltage from the power source drops below a pre-set voltage.

9. The electronic control apparatus of claim 1 wherein the means for sampling voltage input comprises a transformer which reduces line voltage through a full wave range rectifier, which in turn provides a rectified full wave signal to a direct current regulator.

10. The electronic control apparatus of claim 3 wherein the means for sampling current input to detect over-current conditions comprises a comparator connected between the motor and electrical power source which compares the current input to a reference current preset by a variable resistor.

11. The electronic control apparatus of claim 4 wherein the means for sampling current input to detect over-current conditions comprises a comparator connected between the motor and electrical power source which compares the current input to a reference current preset by a variable resistor.

12. The electronic control apparatus of claim 1 wherein the means for rectifying the sampled voltage input consists of a transformer which reduces line voltage to provide same to a full-wave bridge rectifier to yield a rectified full-wave signal.

13. The electronic control apparatus of claim 2 wherein the means for comparing the rectified voltage consists of a comparator that compares voltage output from the rectifier to a preset reference voltage provided by a regulator.

14. The electronic control apparatus of claim 3 wherein the means for comparing the sampled current input to preset reference current consists of a comparator which compares the current input to the preset current provided by a resistor network.

15. The electronic control apparatus of claim 4 wherein the means for comparing the sampled current input to preset reference current consists of a comparator which compares the current input to the preset current provided by a resistor network.

16. The electronic control apparatus of claim 5 wherein the means for delaying re-commencement of electrical power consists of a time delay circuit connected between an under-voltage detector and logic circuit.

17. The electronic control apparatus of claim 6 wherein the means for delaying re-commencement of electrical power consists of a time delay circuit connected between an under-voltage detector and logic circuit.

18. The electronic control apparatus of claim 7 wherein the means for delaying re-commencement of electrical power consists of a time delay circuit connected between an under-voltage detector and logic circuit.

19. The electronic control apparatus of claim 8 wherein the means for delaying re-commencement of electrical power consists of a time delay circuit connected between an under-voltage detector and logic circuit.

20. A method of continuously monitoring the minimum voltage and current requirements of an AC motor and providing those requirements to the motor, using an electronic control apparatus comprising a means for sampling voltage input provided by an electrical source to the motor, said means being connected to an input line from the electrical source; a means for rectifying the sample voltage input taken from the electrical source to yield a rectified output voltage; a means for creating a fixed pulse indicating zero voltage crossing; a means for sampling current input being provided by the electrical source to the motor to create a time-variable pulse indicating zero current crossing, said time-variable pulse which triggers a fixed monostable output voltage; and means for adjusting voltage supplied to the motor by using the fixed pulse indicating zero voltage crossing and the monostable output voltage, said method comprising the steps of:

sampling both incoming voltage and current provided by an electrical source to the motor;

determining by comparison to a preset reference voltage and current whether the incoming voltage and current are within limits for the motor;

supplying said voltage and current to the motor if the incoming voltage and current are determined to be within limits;

automatically continuously checking a load on the motor during its operation after the voltage and current are supplied; and automatically continuously resetting the voltage and current supplied to the motor according to the load on the motor during its operation.

\* \* \* \* \*